Feb. 23, 1932.  J. M. CLEAVER  1,846,184
DRY CONCENTRATION OF ORE
Filed May 18, 1929   2 Sheets-Sheet 1
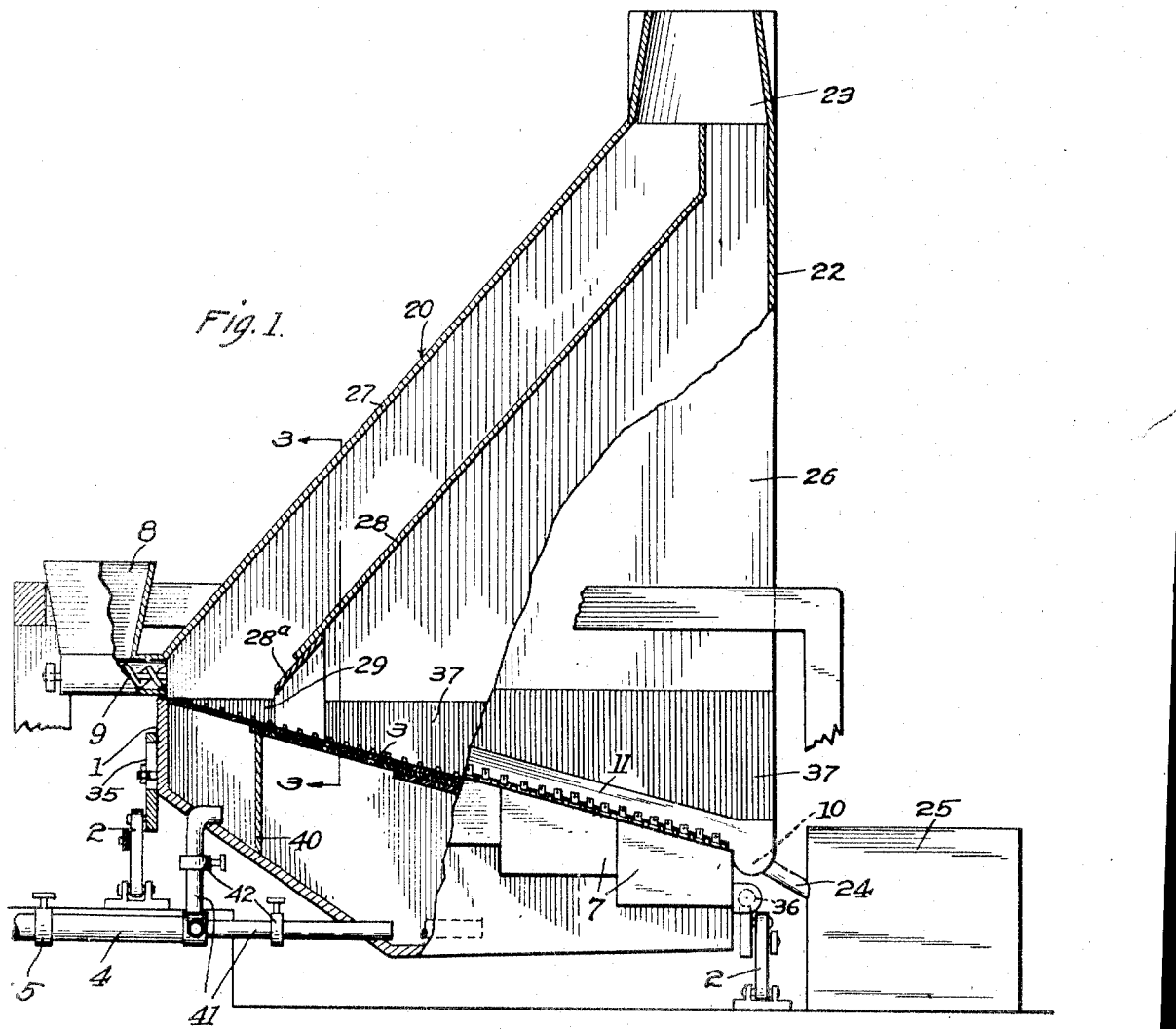
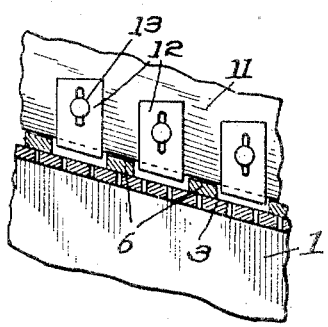
INVENTOR.
John M. Cleaver,
BY
ATTORNEY Feb. 23, 1932.  J. M. CLEAVER  1,846,184
DRY CONCENTRATION OF ORE
Filed May 18, 1929  2 Sheets-Sheet 2
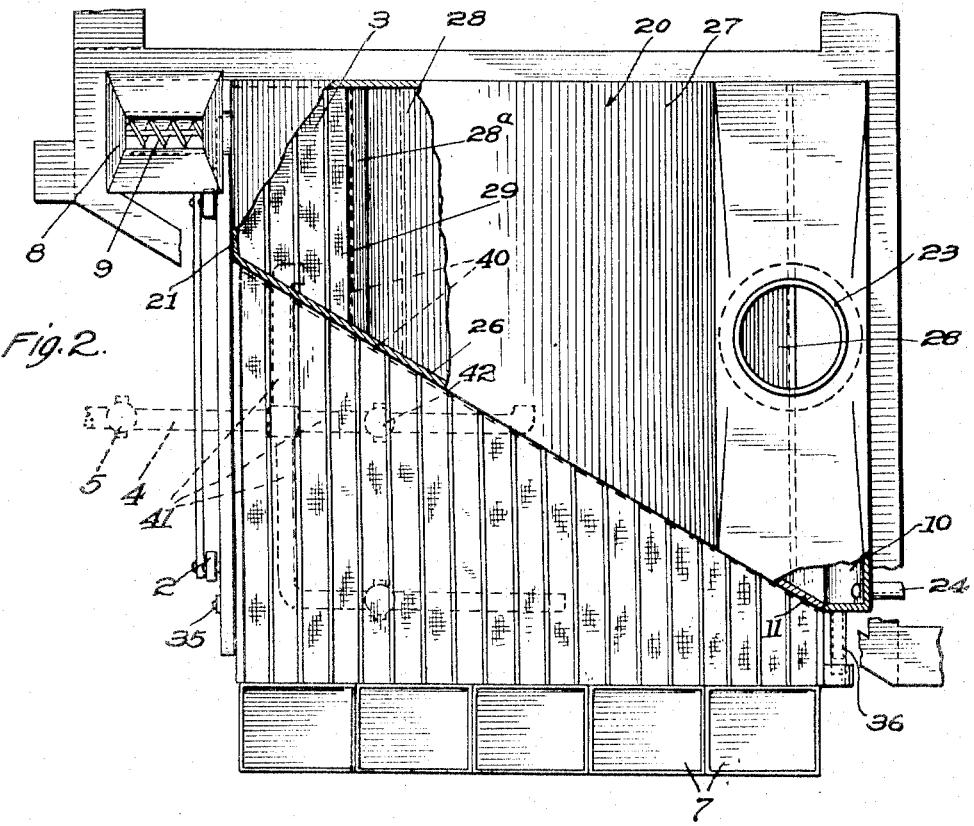
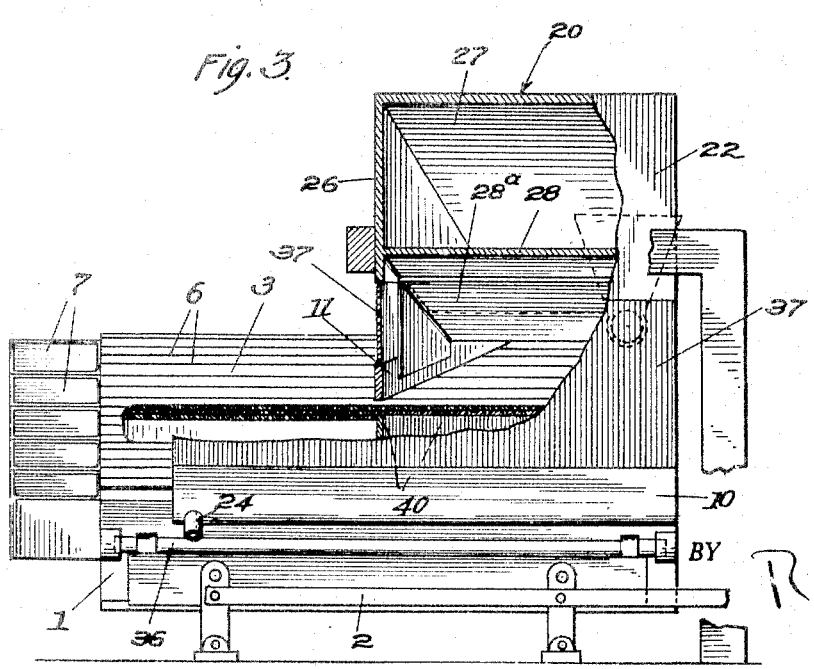
INVENTOR.
John M. Cleaver,
BY
ATTORNEY.

Patented Feb. 23, 1932

1,846,184

UNITED STATES PATENT OFFICE

JOHN M. CLEAVER, OF LOS ANGELES, CALIFORNIA

DRY CONCENTRATION OF ORE

Application filed May 18, 1929. Serial No. 364,119.

This invention relates to the dry concentration of ore upon a concentrating table of the type having a permeable deck adapted for passage of air therethrough so as to form a levitating column for separating the ore in accordance with its specific gravity, in order that the concentrate will settle between riffles extending along the deck in the direction of reciprocating motion which is imparted thereto, while the tailings will flow transversely over the riffles in accordance with the slope of the deck. It is the object of the invention to utilize the air column for disruptive diffusion of the ore as it is supplied to the deck, in order that the particles of mixed materials may be completely separated and thus individually subjected to the levitating action of the air, and at the same time prevent any of the fine values being carried off by the air and lost.

The invention is thus particularly applicable to the concentration of milled ore containing appreciable fine dust which the air necessary to break up clumps of materials would otherwise tend to carry off and thereby lose the fine particles of values contained therein, the invention providing for confinement of all such dust and the subjecting thereof to a gradually diminishing air column rising through the permeable deck, so as to insure settling and recovery of even the finer dust-like values, with final escape to the atmosphere of only a small amount of the finest non-valuable dust, and choked discharge of all of the remaining tailings including a large proportion of even the dust-like gangue.

More particularly it is an object of the invention to provide the riffle table with a vented hood for confining all of the dust-like ore which is supplied to the permeable deck, and adapted to gradually retard levitation of the dust in the air current induced by the relatively strong initial air column which disperses the individual particles of ore, so that only the finest particles of dust of non-values will finally escape through the vent, and all of the remaining dust containing some values will be confined in the hood but will settle from the path of the relatively strong initial air current, for redeposit on the deck at a point where it will be subjected to a materially reduced column of air providing for segregation of even the finest values.

It is a further object of the invention to provide the hood with a baffle adapted to collect the dust which gravitates from the initial air current, and shield the same against direct contact by the air column permeating upwardly through the remaining surface of the deck and tending to prevent redeposit of the dust, so that the collected dust may gravitate along the baffle for even and continuous discharge onto the deck at a point permitting its subsequent appreciable traverse of the riffle surface while subjected to the reduced column of air which is adapted to segregate even the finest particles of values.

The invention therefore not only confines the dust which may rise from milled ore supplied to the riffle table, but prevents immediate escape of such dust even when subjected to the relatively strong initial column of air necessary to break up the clumps of mixed materials so that the individual particles may be subjected to the levitating action; and the invention also provides for collecting all of the confined dust except the finest particles of non-values which may be discharged through the vent of the hood, and removing said dust from the path of the initial air current and redepositing the same upon the riffle table in a steady flow and at a point adapting the dust for levitation in a reduced column of air providing for recovery of even the finest values.

The invention will be readily understood from the following description of the accompanying drawings showing a preferred apparatus and in which:

Fig. 1 is a side elevation of the invention, partly in vertical section.

Fig. 2 is a plan view of the apparatus, partly in horizontal section.

Fig. 3 is a rear elevation of the apparatus, partly broken away on the line 3—3 of Fig. 1.

Fig. 4 is a detail section on the line 4—4 of Fig. 3.

The invention is applicable to a dry concentrator of usual construction, wherein a table 1 is mounted at an appreciable slope in the direction of movement of the gangue as shown in Fig. 1, and is adapted for reciprocation in a direction at right-angles thereto, as for example by usual rock arms 2. The upper surface of the table is a permeable deck 3 of a suitable mesh material permitting air to flow upwardly therethrough, and the air may be supplied to the enclosed space below the deck as shown at 4, with the supply of air preferably adapted for regulation by suitable valvular means shown at 5.

Transversely spaced parallel riffles 6 extend along the deck in the direction of its reciprocation, and the spaces between the riffles are adapted for flow of concentrate along the same for discharge into suitable containers 7 at the front edge of the table, a plurality of said containers being preferably employed so as to respectively collect the concentrate from successive levels along the table in the direction of its slope as shown in Figs. 1 and 2, and thereby provide for desired classification of the recovered values. At the elevated end of the sloping table and adjacent its rear edge, a hopper 8 is adapted to supply ore to the deck 3, and is preferably provided with a choked force feed 9 spaced slightly above the table and adapted to discharge a predetermined uniform stream of ore onto the deck. Reciprocation of the table in the direction of its riffles and at right angles to its slope, will thus tend to settle the values between the riffles and move the same across the table along the riffles for ultimate discharge into containers 7, while the lighter gangue will rise to the top of the mass of ore and move across the riffles and along the table in the direction of its slope, for ultimate discharge at a trough 10 which preferably extends across the lower end of the sloping table from the rear edge thereof to a skimmer 11 which will now be described.

The skimmer is mounted in usual manner upon riffles 6, and extends the length of the table in the direction of its slope with the end of the skimmer which is at the high end of the sloping table preferably spaced a relatively short distance from the rear edge of the deck and the opposite end of the skimmer spaced an appreciably increased distance from the rear edge of the deck so that the skimmer extends along the table at an appreciable angle as shown in Fig. 2. The skimmer thus permits the settled values to flow along the spaces between the riffles and under the skimmer for ultimate discharge at the front edge of the table, while obstructing similar flow of the gangue which will have levitated to the top of the mass of ore and to a position above riffles 6, so that the gangue must gravitate along the table in the direction of its slope for ultimate discharge into trough 10. To insure an accurately controlled skimming action for definitely separating the values and non-values, the skimmer is preferably provided with independently adjustable gates 12 adapted for predetermined projection into the respective spaces between next adjacent riffles 6 as shown in detail in Fig. 4, the said gates being illustrated as readily adjustable by means of slot and set-screw mountings 13.

The air which is forced upwardly through the permeable deck 3 is for the purpose of insuring levitation of the non-values so that they will gravitate across the riffles and along the table in the direction of its slope, while the values which are of greater specific gravity will settle in the air column and thus be confined in the spaces between the riffles for movement across the table in accordance with its reciprocation. The air may permeate only that portion of deck 3 which is between skimmer 11 and the rear edge of the table and which is hereinafter referred to as the essentially active portion of the deck, or if desired and as shown in the drawings the air may also permeate that portion of the deck which is in front of skimmer 11 and which as hereinafter described constitutes an open portion of the deck. The column of air permeating the active portion of the deck is preferably of greater velocity than that which may be optionally employed at the open portion of the deck, and said column of air for the active portion of the deck, as well as the lesser column which is sometimes employed at the open portion of the deck, is preferably of gradually decreasing velocity toward the lower end of the sloping deck, with that part of the column of air which is at the upper end of the active portion of the deck and which is of maximum velocity, preferably of sufficient strength to completely break up all clumps of ore. Such variations in the air column may be obtained by covering the different portions of table 1 with varying thicknesses of the mesh material forming deck 3 so as to permit greater or less passage of air. Thus for example the upper end of the active portion of the sloping deck may comprise a single thickness of the mesh material, with a gradually increasing number of thicknesses employed along said active portion of the deck in the direction of its downward slope as shown in Fig. 1, and if mesh material is employed at the open portion of the deck it will preferably be of a still greater number of thicknesses of material as shown in Fig. 3, with said number of thicknesses gradually increasing in the direction of the downward slope of the table.

By the arrangement as thus described the ore supplied to the concentrator will be initially subjected to an air column of appreciable force at the upper end of the active portion of deck 3, for completely breaking up clumps of material so that the individual particles may be subjected to the levitating action of the air for accurately separating the values and non-valves; and as the dispersed particles of material are moved by gravity across the riffles and along the active portion of the deck in the direction of its slope, they are levitated by a gradually decreasing air column for settling the values from the relatively lighter non-values. All of the values will thus finally be concentrated in the spaces between the riffles and at some point along the deck in the direction of its slope, and will flow along said spaces between the riffles and under the skimmer 11 which will accurately separate all of the gangue from the concentrate, so that continued movement of the values along the spaces between the riffles responsive to the reciprocation of the table will finally discharge the concentrate into containers 7. If an air column is employed beneath the open portion of deck 3, the concentrate throughout its movement across the same will be subjected to further levitation of its lighter particles which may thus gravitate across the riffles and along the deck in the direction of its slope, so that the air column permeating said open portion of the deck and gradually reducing in velocity toward the lower end of the sloping table will classify the values in the respective spaces between the riffles.

When finely milled ore is being concentrated, any dust-like particles of ore, comprising both values and non-values, may possibly float clear of the deck 3 when the ore is supplied to the concentrator table from hopper 8, and may thus escape into the atmosphere without deposit on the riffle table, thereby losing all of the finer values contained in said dust; and this conditon is of course particularly aggravated when as in the construction described the ore is initially subjected to an air column of sufficient velocity to insure breaking up of all clumps of material. The present invention provides for confining such dust-like material with final escape to the atmosphere of only the very lightest particles of dust comprising non-values, and assured deposit upon the riffle table of all the remaining dust which may contain values, so that said dust is subjected to the levitating action of the materially reduced column of air at the lower end of the sloping deck and which provides for gravity separation of even the finest values.

As an instance of this arrangement a hood 20 is preferably mounted on table 1 with its end and side walls projecting upwardly from the edges of the active portion of the deck so as to form a confined space above the active deck; and the force feed 9 for the supply hopper 8 preferably opens through an end wall 21 of the hood for discharging ore onto the upper end of the active portion of the deck as previously described, and the opposite end wall 22 of the hood preferably cooperates with trough 10 to form an enclosed conduit adapted to receive the tailings from deck 3. A vent 23 which may open to the atmosphere is preferably provided at the top of the hood adjacent its end wall 22, and the enclosed conduit 10 which is formed by said end wall preferably discharges through a closed spout 24 into a closed receptacle 25.

The dust in the ore which is supplied to the active portion of deck 3 is thus confined by the hood 20 and is moved along the hood in the direction of the slope of table 1 and toward vent 23 by the current of air induced by the column of air permeating upwardly through the deck, and the confined dust is thus progressively subjected to the gradually reduced velocity of said column of air toward the lower end of the sloping deck, for gradually settling onto the deck those heavier particles of dust which may include values, and discharging through vent 23 only those lightest particles of dust which include none of the values. The heavier dust is thus subjected to the concentrating action previously described, in order to recover all of the values of even the finest mesh as a result of the accurate segregation which is made possible by the gradual reduction in the velocity of the air column toward the lower end of the sloping table, and the dust comprising the non-values will gravitate across the riffles 6 along with the coarser tailings, for discharge into the enclosed trough 10 and thence through spout 24 into the enclosed receptacle 25, thereby avoiding the inconvenience and annoyance of free discharge of the dust into the atmosphere, as well as avoiding any loss of values with the dust.

The hood 20 as thus far described, while confining the dust against discharge through vent 23 of any except the finest particles of the relatively light non-values, might not prevent the confined dust from simply floating along the length of the sloping table without actually settling thereon, until the dust reached end wall 22 of the hood, whereupon it might drop into trough 10 for discharge with the tailings without ever having been deposited upon the riffle surface of deck 3 for segregation of any values contained therein. This movement of the dust causing loss of the finer dustlike values with the tailings, might result from such fine diffusion of the dust within the hood as would maintain it levitated and rapidly carried along the length of the hood by the initial air current to which it is subjected, so that it would have no opportunity to settle onto the deck through the column of air of gradually reduced velocity which is employed at the lower end of the sloping table. In order to avoid this possibility the hood is preferably arranged so as to gradually retard the current of air flowing therethrough toward its vented end, and is preferably also provided with means for so shielding the confined dust from the air column rising through the lower end of the permeable deck, as to permit the dust to settle and collect in a form adapting it for discharge onto the deck in a steady flow and at a point beyond the rapidly moving air column which initially disrupts the individual particles, of materials, but still sufficiently high up along the sloping deck to insure appreciable subsequent movement of the dust across the riffles 6 for segregating all of the values before final discharge of the tailings into trough 10.

As an instance of this arrangement the front side wall 26 of hood 20 is shown as following the angular disposition of skimmer 11 so that the confined space within the hood is of gradually increasing width along the length of table 1 in the direction of its downward slope and toward the vented end of the hood as shown in Fig. 2; and the top 27 of the hood is preferably spaced but slightly above the force feed 9 at end 21 of the hood and then slopes upwardly toward the opposite vented end of the hood as shown in Fig. 1, so that the confined space within the hood is of gradually increasing height as well as width toward its vented end. A baffle 28 is preferably provided within the confined space defined by the hood, and extends the width of said space and is preferably parallel to the top 27 of the hood as shown in Fig. 1, with the upper end of the baffle preferably bisecting the vent 23, and the lower end of the baffle spaced appreciably above deck 3 and from the end wall 21 of the hood so that it is at a point indicated at 29 which is just beyond the path of travel of that initial portion of the column of air rising through deck 3 which is of such relatively rapid velocity as to break up and disperse the clumps of material.

As a result of this construction the dust mixed with the ore which is discharged onto deck 3 will be levitated by the initial air column of rapid velocity, and will be forced upwardly thereby into the space between baffle 28 and the top 27 of the hood; but since this space is of gradually increasing cross-sectional area due to the angular disposition of the front wall 26 of the hood, the current of air moving toward vent 23 will be gradually retarded, and the suspended dust will thus be subjected to a gradually reduced leviating force so that all of the dust except possibly a small portion of the lighter particles which constitute non-values and which may be discharged into the atmosphere through the vent, will finally settle onto baffle 28, and being thus removed from the direct path of the air current will gravitate along the downwardly sloping baffle for dicharge onto deck 3 at the point 29. The dust moving down the baffle is shielded thereby from the air column rising through the deck below the point 29, so that the dust may readily collect in a steady stream for uniform discharge onto the deck, and since the point of discharge 29 is at the outer edge of the path of travel of the initial disruptive air column, the discharged dust is not re-subjected to dispersion by such initial column of air but will readily settle onto the deck through the air column of reduced velocity which is encountered at the point 29.

The dust when thus deposited on deck 3 is subjected to the leviating action of the reduced air column encountered below the point 29 and which is of gradually diminishing velocity toward the lower end of the sloping deck, and the values contained in the dust are thus segregated in the spaces between riffles 6, while the lighter dust may be forced upwardly into hood 20. The levitated dust is confined by the hood against free escape to the atmosphere, and the gradual retarding of the air current in the hood due to the enlargement of its cross-sectional area as it moves toward vent 23, insures the heavier dust which may possibly contain values again settling upon the riffle table at a point further down the same in the direction of its slope and where a still further reduced air column will be encountered, so that only a small part of the lightest dust comprising only non-values will finally escape through vent 23, while the redeposited heavier dust will again traverse the riffles 6 and eventually have all of the values separated therefrom and collected in the spaces between the riffles, due to the accurate segregation which is made possible by the continuing reduction in the velocity of the air column toward the lower end of the sloping deck. The dust which does not finally settle in the spaces between the riffles, together with the coarser tailing which also continue to gravitate along the table in the direction of its slope without collecting between the riffles, is thus eventually discharged into trough 10, while all of the classified concentrate is collected as previously described, and by discharging the tailings into closed receptacle 25 the dust contained therein is still confined so as to avoid the annoyance of its free discharge into the atmosphere.

I have thus provided for usual dry concentration of ore, with all of the dust which may be mixed with the ore confined against free discharge into the atmosphere, so that only the very lightest paticles of dust comprising only non-valves will eventually escape, while all of the relatively heavier dust which may contain values will be subjected to a gradually decreasing levitating force for completely segregating even the finest values and finally discharging all of the tailings including the non-valuable dust without escape of the latter into the atmosphere.

The invention is applicable to any usual dry concentrator, such as is preferably arranged for varying the slope of its deck 3, as for example by usual adjustments 35 adapted to rock the table 1 on shaft 36, with flexible closure means 37 preferably connecting the walls of hood 20 and the adjustble riffle table; and in order to maintain uniform spacing of the lower end of baffle 28 from the deck 3 when the slope of table 1 is adjusted, the lower end of said baffle is preferably a separate baffle plate 28ª supported by the table in fixed spaced relation from deck 3 and adapted to slidably overlap the main baffle 28.

In addition to the control of the air current through the various portions of deck 3 by the use of varying thicknesses of permeable material as has been described, the said air currents may be more definitely regulated by separately supplying the air to the various portions of the deck. Thus for example the enclosed space below the deck may have partitions 40 forming separate air chambers communicating respectively with the upper end of the active portion of the deck between end wall 21 and the point 29, and with the lower end of said active portion of the deck between the point 29 and the end wall 22, and with the open portion of the deck beyond hood 20, the respective air chambers being shown as separately communicating with the air trunk 4 by conduits 41 which are each provided with a valvular control 42.

I claim:

1. The method of concentrating mixed materials having some proportion of dust-like particles, which comprises separating values and non-values of the mixed materials by the levitating action of a column of air which is of diminishing velocity cross-sectionally thereof in the direction of movement of tailings, confining the dust-like particles which may tend to float clear, obstructing movement of the confined dust in the direction of movement of tailings, shielding the obstructed dust from that cross-sectional portion of the column of air which is toward the tailings discharge, and collecting and settling all of the obstructed dust in appreciably spaced relation in advance of the tailings discharge.

2. A concentrator comprising a riffle table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, and a baffle extending upwardly in the hood to the vent for baffling flow of the air current toward the vent.

3. A concentrator comprising a riffle table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, and a baffle extending upwardly in the hood to the vent for baffling flow of the air current toward the vent, said baffle being adapted for settling thereon of dust suspended in the air current and discharge of said dust onto the permeable deck at a point appreciably spaced from the end of the table which is adapted for discharge of tailings.

4. A concentrator comprising a riffle table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, and a baffle extending upwardly in the hood to the vent for baffling flow of the air current toward the vent, said baffle being adapted for settling thereon of dust suspended in the air current and so positioned as to shield said dust from that cross-sectional portion of the column of air which is toward the end of the table adapted for discharge of tailings, and the baffle being adapted to discharge the settled dust onto the permeable deck at a point appreciably spaced from the end of the table which is adapted for discharge of tailings.

5. A concentrator comprising a riffle table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, the said hood being of increasing cross-sectional area in the direction of movement of the air current toward the vent, and a baffle sloping upwardly in the hood toward the end of the table which is adapted for discharge of tailings, with the upper end of the baffle bisecting the vent, and the lower end of the baffle spaced above the permeable deck and also in restricted spaced relation from that end of the table upon which material is adapted to be discharged and which is opposite said tailing discharge end of the table.

6. A concentrator comprising a permeable deck adapted for passage therethrough of a column of air, a hood overlying and enclosing the permeable deck and having a vent so positioned that said air column will produce a current of air in the hood flowing in the direction of movement of tailings along the deck, the said hood being of increasing cross-sectional area in the direction of movement of the air current toward the vent, and a baffle extending upwardly in the hood to the vent for baffling flow of the air current toward the vent.

7. A concentrator comprising a permeable deck adapted for passage therethrough of a column of air, a hood overlying and enclosing the permeable deck and having a vent so positioned that said air column will produce a current of air in the hood flowing in the direction of movement of tailings along the deck, the said hood being of increasing cross-sectional area in the direction of movement of the air current toward the vent, and a baffle extending upwardly in the hood to the vent for baffling flow of the air current toward the vent, said baffle being adapted for settling thereon of dust suspended in the air current and discharge of said dust onto the deck at a point appreciably spaced from the end thereof which is adapted for discharge of tailings.

8. A concentrator comprising a permeable deck adapted for passage therethrough of a column of air, a hood overlying and enclosing the permeable deck and having a vent so positioned that said air column will produce a current of air in the hood flowing in the direction of movement of tailings along the deck, the said hood being of increasing cross-sectional area in the direction of movement of the air current toward the vent, and a baffle extending upwardly in the hood to the vent for baffling flow of the air current toward the vent, said baffle being adapted for settling thereon of dust suspended in the air current and so positioned as to shield said dust from that cross-sectional portion of the column of air which is toward the end of the deck adapted for discharge of tailings, and the baffle being adapted to discharge the settled dust onto the deck at a point appreciably spaced from the end thereof which is adapted for discharge of tailings.

9. A concentrator comprising a permeable deck adapted for passage therethrough of a column of air, a hood overlying and enclosing the permeable deck and having a vent so positioned that said air column will produce a current of air in the hood flowing in the direction of movement of tailings along the deck, the said hood being of increasing cross-sectional area in the direction of movement of the air current toward the vent, and a baffle sloping upwardly in the hood toward the vent, with the lower end of the baffle appreciably spaced from the end of the deck which is adapted for discharge of tailings.

10. The method of concentrating mixed materials having some proportion of dust-like particles, which comprises separating values and non-values of the mixed materials by the levitating action of a column of air which is of diminishing velocity cross-sectionally thereof in the direction of movement of tailings, confining the dust-like particles which may tend to float clear of the mixed materials, obstructing movement of the confined dust in the direction of movement of tailings, shielding the obstructed dust from that cross-sectional portion of the column of air which is toward the tailings discharge, and collecting and settling all of the obstructed dust in such spaced relation in advance of said tailings discharge, that in front of said settling point with relation to the direction of movement of tailings, the levitating column of air is of greater velocity than at any portion thereof between said settling point and the tailings discharge.

11. A concentrator comprising a table having a permeable deck adapted for passage therethrough of a column of air diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, and a baffle extending upwardly in the hood to the vent for baffling flow of the air current toward the vent, said baffle being adapted for settling thereon of dust suspended in the air current and discharge of said dust onto the permeable deck at a point so spaced from the end of the table which is adapted for discharge of tailings, that in advance of said point with relation to the direction of movement of tailings, the column of air is of greater velocity than at any portion thereof between said settling point and the tailings discharge.

12. A concentrator comprising a table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, and a baffle extending upwardly in the hood to the vent for baffling flow of the air current toward the vent, said baffle being adapted for settling thereon of dust suspended in the air current and so positioned as to shield said dust from that cross-sectional portion of the column of air which is toward the end of the table adapted for discharge of tailings, and the baffle being adapted to discharge the settled dust onto the permeable deck at a point so spaced from the end of the table which is adapted for discharge of tailings, that in advance of said point with relation to the direction of movement of tailings, the column of air is of greater velocity than at any portion thereof between said settling point and the tailings discharge.

13. A concentrator comprising a table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, the said hood being of increasing cross-sectional area in the direction of movement of the air current toward the vent, and a baffle sloping upwardly in the hood toward the end of the table which is adapted for discharge of tailings.

14. A concentrator comprising a table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, the said hood being of increasing cross-sectional area in the direction of movement of the air current toward the vent, and a baffle sloping upwardly in the hood toward the end of the table which is adapted for discharge of tailings, the lower end of the baffle being spaced above the permeable deck and also in restricted spaced relation from that end of the table upon which material is adapted to be discharged and which is opposite said tailings discharge end of the table.

15. A concentrator comprising a table having a permeable deck adapted for passage therethrough of a column of air of diminishing velocity cross-sectionally thereof in the direction of movement of tailings along the table, a hood overlying and enclosing the permeable deck and having a vent at the top thereof so positioned that said air column will produce a current of air in the hood flowing in the direction of movement of tailings along the table, the said hood being of increasing cross-sectional area in the direction of movement of the air current toward the vent, and a baffle sloping upwardly in the hood toward the end of the table which is adapted for discharge of tailings, the lower end of the baffle being adapted for discharge onto the permeable deck at a point so spaced from the end of the table which is adapted for discharge of tailings, that in advance of said point with relation to the direction of movement of tailings, the column of air is of greater velocity than at any portion thereof between said settling point and the tailings discharge.

In testimony whereof he has affixed his signature.

JOHN M. CLEAVER.